(12) United States Patent
Christensen et al.

(10) Patent No.: US 10,968,888 B2
(45) Date of Patent: Apr. 6, 2021

(54) METHOD FOR CONTROLLING AIR DEFLECTORS AND PITCH ANGLES OF WIND TURBINE BLADES

(71) Applicant: VESTAS WIND SYSTEMS A/S, Aarhus N (DK)

(72) Inventors: Poul Brandt Christensen, Ry (DK); Claus Thybo, Sønderborg (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 93 days.

(21) Appl. No.: 16/336,015

(22) PCT Filed: Sep. 20, 2017

(86) PCT No.: PCT/DK2017/050300
§ 371 (c)(1),
(2) Date: Mar. 22, 2019

(87) PCT Pub. No.: WO2018/054439
PCT Pub. Date: Mar. 29, 2018

(65) Prior Publication Data
US 2019/0368467 A1  Dec. 5, 2019

(30) Foreign Application Priority Data
Sep. 22, 2016 (DK) .................. 2016 70752

(51) Int. Cl.
*F03D 1/00* (2006.01)
*F03D 7/02* (2006.01)
(Continued)

(52) U.S. Cl.
CPC .............. *F03D 7/0232* (2013.01); *F03D 1/06* (2013.01); *F03D 7/024* (2013.01); *F03D 7/0224* (2013.01);
(Continued)

(58) Field of Classification Search
CPC .... F03D 1/0675; F03D 7/0224; F03D 7/0232; F03D 7/024; F05B 2240/3052; F05B 2260/71; F05B 2270/1011
See application file for complete search history.

(56) References Cited

U.S. PATENT DOCUMENTS 9,506,453 B2 * 11/2016 Baker .................. F03D 7/0232
9,689,374 B2 * 6/2017 Dixon .................. F03D 7/0224
(Continued)

FOREIGN PATENT DOCUMENTS

EP  2128385 A2  12/2009
EP  2264311 A2  12/2010
(Continued)

OTHER PUBLICATIONS

PCT Written Opinion of the International Searching Authority for Application No. PCT/DK2017/050300 dated Aug. 12, 2017.
(Continued)

*Primary Examiner* — Ninh H. Nguyen
(74) *Attorney, Agent, or Firm* — Patterson + Sheridan, LLP

(57) ABSTRACT

A method for controlling a wind turbine is disclosed, the wind turbine comprising a set of wind turbine blades (1), each wind turbine blade (1) being provided with at least one air deflector (2) being movable between an activated position in which it protrudes from a surface of the wind turbine blade (1) and a de-activated position. The occurrence of an event causing a change in operational conditions is registered, and a new operating state for the wind turbine is determined, the new operating state meeting requirements of the changed operational conditions. The air deflectors (2) of the wind turbine blades (1) and pitch angles of the wind turbines blades (1) are controlled in order to reach the new operating state for the wind turbine, and in such a manner that the control of the pitch angles of the wind turbine blades
(Continued)

(1) is performed while taking information regarding the control of the air deflectors (2) into account.

15 Claims, 7 Drawing Sheets

(51) Int. Cl.
  *F03D 17/00* (2016.01)
  *F03D 1/06* (2006.01)
  *F03D 7/04* (2006.01)
(52) U.S. Cl.
  CPC ............ *F03D 7/042* (2013.01); *F03D 17/00* (2016.05); *F05B 2240/221* (2013.01); *F05B 2240/3052* (2020.08); *F05B 2240/313* (2013.01); *F05B 2260/70* (2013.01); *F05B 2260/71* (2013.01); *F05B 2270/1011* (2013.01); *F05B 2270/20* (2013.01); *F05B 2270/301* (2013.01); *F05B 2270/321* (2013.01); *F05B 2270/322* (2013.01); *F05B 2270/337* (2013.01)

(56) References Cited

U.S. PATENT DOCUMENTS

| | | | | |
|---|---|---|---|---|
| 9,926,911 | B2 * | 3/2018 | Butterworth | ............ F03D 7/044 |
| 10,570,881 | B2 * | 2/2020 | Egedal | ................. F03D 7/0224 |

FOREIGN PATENT DOCUMENTS

| | | |
|---|---|---|
| EP | 2778400 A2 | 9/2014 |
| EP | 2778402 A2 | 9/2014 |
| EP | 2995811 A1 | 3/2016 |
| EP | 3029317 A1 | 6/2016 |
| WO | 2018054439 A1 | 3/2018 |

OTHER PUBLICATIONS

PCT International Search Report for Application No. PCT/DK2017/050300 dated Aug. 12, 2017.

Danish Patent and Trademark Office 1st Technical Examination of Application No. PA 2016 70752 dated Mar. 24, 2017.

* cited by examiner

METHOD FOR CONTROLLING AIR DEFLECTORS AND PITCH ANGLES OF WIND TURBINE BLADES

FIELD OF THE INVENTION

The present invention relates to a method for controlling a wind turbine comprising a set of wind turbine blades. More specifically, the invention relates to a method for controlling air deflectors and pitch angles of the wind turbine blades.

BACKGROUND OF THE INVENTION

Modern wind turbines are controlled and regulated continuously with the purpose of ensuring optimal power extraction from the wind under the current wind, and weather, while at the same time ensuring that the loads on the different components of the wind turbine are at any time kept within acceptable limits, and while respecting any externally set operational constraints.

During operation a wind turbine needs to be able to adapt to and shift between changing operational conditions. Such changing operational conditions may originate in different ambient conditions, e.g. wind or weather conditions, as well as in grid related events. An ambient condition may be a wind directional change or a gust, and a grid related event may be to adapt the turbine to a new power reference, adapting the operation to a grid loss, etc.

When adapting for a new operational condition it is important to take into account how fast the turbine needs to react to a new situation, how fast the operational state should be changed, as well as the loads involved in the transition of the operational states.

Modern wind turbines are often controlled based on pitch actuation which regulates the aerodynamic properties of the wind turbine blades. By pitching the blades, it is possible to control the lift and drag experienced by the wind turbine blade. It is normal practise to pitch the blades according to some pitching strategy, in connection with adapting the turbine to a new operating situation. In order to provide further possibilities for controlling the aerodynamic properties of a wind turbine blade, a number of concepts have been proposed, including so-called air deflectors. Air deflectors are elements configurable to be in an activated state where they are pushed out of the blade to alter the aerodynamic properties of the blade, and in a de-activated state where a top portion of the air deflector forms a portion of the surface of the rotor.

An example of an air deflector system is provided in U.S. Pat. No. 8,192,161.

DESCRIPTION OF THE INVENTION

It is an object of embodiments of the invention to provide improved control of a wind turbine during transition from one operating state to another operating state following an event, in which one or more of improved control of reaction time, improved control of transition time, or improved control of loads, is/are obtained.

The invention provides a method for controlling a wind turbine, the wind turbine comprising a set of wind turbine blades, each wind turbine blade being provided with at least one air deflector being movable between an activated position in which it protrudes from a surface of the wind turbine blade and a de-activated position, the wind turbine being operated in a first operating state, the method comprising the steps of:

registering the occurrence of an event causing a change in operational conditions, determining a new operating state for the wind turbine, the new operating state meeting requirements of the changed operational conditions, and controlling the air deflectors of the wind turbine blades and pitch angles of the wind turbines blades in order to reach the new operating state for the wind turbine, wherein the control of the pitch angles of the wind turbine blades is performed while taking information regarding the control of the air deflectors into account.

The invention provides a method for controlling a wind turbine. The wind turbine comprises a set of wind turbine blades. During operation of the wind turbine, the incoming wind acts on the wind turbine blades, thereby causing a rotor to rotate. The rotating movements of the rotor are transformed into electrical energy by means of a generator. The rotor may be connected to the generator via a gear arrangement, or it may be connected directly to the generator. The latter case is sometimes referred to as a direct drive wind turbine.

Each wind turbine blade is provided with at least one air deflector being movable between an activated position in which it protrudes from a surface of the wind turbine blade and a de-activated position. In the de-activated position the air deflector is not protruding from the surface of the wind turbine blade, and it may advantageously form a portion of the surface.

In the present context the term 'air deflector' should be interpreted to mean a device being configured to extend from a surface, in particular a surface of a wind turbine blade, in order to modify the air flow across the surface, when being in an activated state. Thereby, activating an air deflector causes a change in the aerodynamic properties of the surface, for instance affecting the lift and/or the drag of a wind turbine blade, and/or affecting a boundary layer along the surface. This may, e.g., result in an increase or a decrease of power production of the wind turbine, and/or in a decrease in loads on the wind turbine, thereby minimising the risk of potential damage to components of the wind turbine.

The air deflectors may be arranged on the wind turbine blades at various positions along a chordwise direction, such as at or near a leading edge, at or near a trailing edge and/or at a mid-chord position. Furthermore, air deflectors may be arranged on a suction side of the wind turbine blades and/or on a pressure side of the wind turbine blades. In an embodiment, the air deflector is placed on the suction side. Such air deflectors may upon activation diminish the lift of the blade.

Each wind turbine blade may comprise a plurality of air deflectors, e.g. distributed along a lengthwise direction of the wind turbine blade. In this case the air deflectors may be adapted to be activated and de-activated individually, i.e. at a given point in time some of the air deflectors may be in the activated position while other air deflectors are in the de-activated position.

Initially, the wind turbine is operated in a first operating state. The first operating state meets the requirements of the prevailing operational conditions, e.g. in terms of wind speed, wind direction, wind shear, gusts, power reference, load limits, noise limits, etc. Thus, the first operating state represents a manner of operating the wind turbine, which is appropriate under the initially prevailing operational conditions.

While operating the wind turbine in the first operating state, the occurrence of an event causing a change in operational conditions is registered. The event could, e.g., be a change in wind or weather conditions, a change in power reference, a shut down command, a grid loss, or any other event which has an impact on the operational conditions. Since the event causes a change in operational conditions, the first operating state is most likely no longer appropriate, since it might not meet the requirements of the changed operational conditions.

Accordingly, in response to registering the occurrence of the event, a new operating state for the wind turbine is determined. The new operating state is determined in such a manner that it meets the requirements of the changed operating conditions, i.e. it is appropriate under the operational conditions which are prevailing following the registered event.

The objective is now to perform a transition from the first operating state to the new operating state, in a manner which fulfils certain criteria, e.g. in terms of reaction time, transition time, load impact, power production, etc. The exact criteria may depend on the kind of event being registered. For instance, for some kinds of events minimising the load impact may be crucial, while for other kinds of events the reaction time or the transition time may be more important.

In order to perform this transition, the air deflectors of the wind turbine blades and pitch angles of the wind turbine blades are finally controlled in order to reach the new operating state for the wind turbine. This is done in such a manner that the control of the pitch angles of the wind turbine blades is performed while taking information regarding the control of the air deflectors into account.

Air deflectors provide fast reaction times, but the impact on the aerodynamic properties of the wind turbine blades is normally smaller than what can be obtained by adjusting the pitch angles of the wind turbine blades, and this may have a negative influence on the transition time from the first operating state to the new operating state. However, the load impact on the wind turbine blades, blade pitch bearings, etc. may be lower when applying air deflectors than when adjusting the pitch angles of the wind turbine blades.

On the other hand, adjusting the pitch angles of the wind turbine blades has a relatively high impact on the aerodynamic properties of the wind turbine blades, thereby allowing the new operating state to be reached within a short transition time. However, the reaction time for adjusting the pitch angles is normally slower than the reaction times for activating air deflectors. Furthermore, the noise level generated as a consequence of positioning the wind turbine blades at an adjusted pitch angle is lower than the noise level generated as a consequence of air deflectors having been activated. However, adjusting the pitch angles of the wind turbine blades causes wear and tear on the blade pitch bearings and may have an undesired load impact on the wind turbine blades in general.

Thus, depending on the criteria which need to be fulfilled, an appropriate mix of controlling the air deflectors and controlling the pitch angles of the wind turbine blades can be selected. This is possible because the control of the pitch angles is performed while taking information regarding the control of the air deflectors into account. Accordingly, the controller which performs the control of the pitch angles 'knows' how the air deflectors are controlled, or at least the state of the air deflectors and the expected impact, and this knowledge is used for providing an appropriate control of the pitch angles. Thereby a synergy between the control of the air deflectors and the control of the pitch angles is obtained, which allows an optimal transition from the first operating state to the new operating state.

The step of controlling the air deflectors and the pitch angles of the wind turbine blades may comprise the steps of:
controlling the air deflectors based on one or more sensor input, using an air deflector controller,
the air deflector controller providing information regarding the control of the air deflectors to a pitch controller, and
controlling the pitch angles of the wind turbine blades, using the pitch controller, and taking the information regarding the control of the air deflectors into account.

According to this embodiment, the air deflectors are controlled in an independent or autonomous manner, in the sense that they are controlled on the basis of the sensor input, and possibly without taking control of the pitch angles of the wind turbine blades into account. However, the pitch controller is provided with information regarding the control of the air deflectors, thereby allowing the pitch controller to take this information into account during control of the pitch angles, as described above.

In the case that the air deflector controller and the pitch controller are separate units, the information may be provided from the air deflector controller to the pitch controller via a communication link between the two controllers. In the case that the air deflector controller and the pitch controller form part of the same unit, the information may be readily available to the pitch controller.

Alternatively or additionally, the step of controlling the air deflectors and the pitch angles of the wind turbine blades may comprise the steps of:
determining an air deflector setting, based on the registered event,
controlling the air deflectors in accordance with the determined air deflector setting, and
controlling the pitch angles of the wind turbine blades, while taking the determined air deflector setting into account.

According to this embodiment, when the occurrence of the event has been registered, an air deflector setting is initially determined, based on the event. The determined air deflector setting is preferably a setting which provides the best possible contribution from air deflectors in reaching the new operating state, while fulfilling selected criteria, e.g. in terms of reaction time, transition time, load impact, etc.

The air deflectors are then controlled in accordance with the determined air deflector setting, and finally, the pitch angles of the wind turbine blades are controlled, while taking the determined air deflector setting into account.

Since the air deflectors are controlled in accordance with a determined air deflector setting, the information regarding the control of the air deflectors is readily available, in the form of the air deflector setting. This information may, e.g., be provided to the pitch controller by a central controller which determines the air deflector setting. As an alternative, the air deflector setting may be determined by the pitch controller, in which case the information is readily available for the pitch controller.

The step of determining an air deflector setting may further be based on the first operating state and/or on the new operating state. According to this embodiment, in addition to being determined on the basis of the registered event, the air deflector setting is also determined on the basis of particulars regarding the first operating state and/or regarding the new operating state. Accordingly, the transition between operating states which needs to take place is taken into account.

The step of controlling the air deflectors and the pitch angles of the wind turbine blades may comprise the steps of:

determining a load impact on the wind turbine and a transition time of reaching the new operating state in a situation where only air deflectors are deployed, determining that the load impact is larger than a target load impact and/or that the transition time is larger than a target transition time, determining a pitch response required in order to reach the target load impact and/or the target transition time, and controlling the pitch angles of the wind turbine blades in accordance with the determined pitch response.

According to this embodiment, in response to the registration of the event, a load impact on the wind turbine and a transition time of reaching the new operating state in a situation where only air deflectors are deployed, is determined. In other words, it is determined which load impacts can be expected, and how long it would take to reach the new operating state, if the transition from the first operating state to the new operating state was to be performed using only control of the air deflectors, i.e. without controlling the pitch angles of the wind turbine blades.

The determined load impact and the determined transition time are then compared to a target load impact and a target transition time, respectively. The target load impact and the target transition time could, e.g., depend on which kind of event has been registered. For instance, for some events there may be strict limits on the transition time. This is, e.g., often the case when the event is an emergency shut down command. Furthermore, the target load impact may be derived from general load limits for various wind turbine parts.

In the case that it is determined that the determined load impact is larger than the target load impact and/or that the determined transition time is larger than the target transition time, then it can be concluded that it will not be possible to reach the new operating state, using only control of the air deflectors, while meeting requirements with respect to load impact on the wind turbine and/or with respect to transition time. Accordingly, control of the pitch angles of the wind turbine blades will also be necessary in order to meet these requirements.

Accordingly, when this is the case, a pitch response required in order to reach the target load impact and/or the target transition time is determined, and the pitch angles of the wind turbine blades are subsequently controlled in accordance with the determined pitch response.

The determined pitch response may advantageously be a pitch response required in order to reach the target load impact and/or the target transition time, given that the air deflectors are controlled in such a manner that the contribution from the air deflectors with respect to meeting these requirements is as high as possible. In this case, the control of the air deflectors and the pitch angles is performed in such a manner that the air deflectors are used to the greatest possible extent, and adjustment of the pitch angles is used for providing the last part, which the air deflectors are not capable of providing.

The pitch response may be determined initially, thereby providing a substantially fixed trajectory from the first operating state to the new operating state. As an alternative, the pitch response may be dynamically determined during the transition from the first operating state to the new operating state, e.g. using a closed loop control strategy.

Thus, according to one embodiment, the air deflectors may be controlled to be fully activated during the transition from the first operating state to the new operating state, and the pitch angles of the wind turbine blades may be controlled to ensure that the target load impact and/or the target transition time is reached.

The air deflectors and the pitch angles of the wind turbine blades may be controlled by means of a central controller. The central controller may be a wind turbine controller which controls the entire wind turbine, including the air deflectors and the pitch angles of the wind turbine blades. As an alternative, the central controller may be a pitch controller. In this case the pitch controller also controls the air deflectors. In any event, according to this embodiment the air deflectors and the pitch angles are controlled by means of the same controller, and thereby information regarding the control of the air deflectors is readily available for the pitch controller.

As an alternative, the air deflectors may be controlled by means of an air deflector controller and the pitch angles may be controlled by means of a pitch controller, and the air deflector controller and the pitch controller may be arranged for communicating with each other.

According to this embodiment, the air deflectors and the pitch angles of the wind turbine blades are controlled by means of separate controllers, and the information regarding control of the air deflectors is therefore not readily available to the pitch controller. However, since the air deflector controller and the pitch controller are arranged for communicating with each other, the air deflector controller can provide this information to the pitch controller.

The registered event may be a change in wind direction, a gust, a change in wind shear, a change in power reference, a shut down command, or a grid loss.

In the case that the registered event is a change in wind direction, the wind turbine must be yawed to a new yaw position. The yawing of the turbine is a slow reacting control and the loads due to the yaw error occurs as fast as the lift on the blades adjust to the (new) yaw error. Accordingly, it may be necessary to change the operating state to a state which handles the loads introduced by the new yaw error.

In the case that the registered event is a gust, this will normally increase the load impact on the wind turbine, and it may therefore be necessary to change the operating state to a state which reduces the loads on at least some of the wind turbine components. This is particularly the case when the gust occurs simultaneously with a change in wind direction. This situation is sometimes referred to as an extreme coherent gust with direction change (ECD) event.

According to an embodiment of the invention, this change in operating state could be obtained by activating the air deflectors, e.g. based on measurements performed by pressure sensors arranged at or near each of the air deflectors. This would cause the pitch controller to adjust the pitch angles of the wind turbine blades less than would be the case if no air deflectors had been activated, since the activation of the air deflectors causes a decrease in flap loads and in generator speed and acceleration.

In the case that the registered event is a change in wind shear, i.e. a change in wind speed difference across the rotor plane, this will also cause a change in the load impact on the wind turbine. Accordingly, it may be necessary to change the operating state to a state which reduces or increases the load impact on at least some of the wind turbine components, in accordance with the change in wind shear. A change in wind shear could, e.g., be caused by gusts or changes in wind direction which only occur in part of the rotor plane. A change in wind shear could also be caused by an extreme coherent gust with direction change (ECD) event, where gusts occur simultaneously with a change in wind direction.

In the case that the registered event is a change in power reference, then the operating state must be changed to a state which causes the wind turbine to output a power level which corresponds to the new power reference. A change in power reference may, e.g., be in the form of an input received from a grid operator or from a wind farm controller.

In the case that the registered event is a shut down command, the operating state must be changed to a state in which operation of the wind turbine is stopped. In the case that the shut down command is an emergency shut down command, it is normally desirable that the transition time from the first operating state to the new operating state is as short as possible, in order to allow the wind turbine to shut down as quickly as possible. However, shutting down a wind turbine very fast may result in a high load impact on the wind turbine, and therefore it may be desirable to coordinate the control of the air deflectors and the control of the pitch angles of the wind turbine blades in such a manner that a suitable trade off between transition time and load impact is obtained.

In the case that the registered event is a grid loss or a voltage drop, this will cause a drop in power. In this case it is necessary to ensure that the wind turbine continues to operate, in order to be able to ensure a quick return to power production. This may be obtained by means of a dump load. As an alternative, the wind turbine blades must be pitched out of the wind fast, in order to keep the acceleration and the speed down. According to the invention, the air deflectors can be activated, thereby allowing the pitch angles of the wind turbine blades to be adjusted less and/or slower.

As an alternative, other kinds of events could be envisaged, which cause a change in operational conditions requiring a change in operating state.

Each air deflector may have at least one pressure sensor associated therewith, each pressure sensor being arranged to measure a pressure prevailing in the vicinity of the associated air deflector, and the air deflectors may be at least partly controlled on the basis of measurements performed by the pressure sensors. Thereby each air deflector is controlled on the basis of pressure conditions prevailing locally at the position of the air deflector. Each air deflector may have only one pressure sensor associated therewith. As an alternative, at least some of the air deflectors may have two or more pressure sensors associated therewith, for instance one pressure sensor arranged on the suction side of the wind turbine blade, and one pressure sensor arranged on the pressure side of the wind turbine blade.

The pitch angles of the wind turbine blades may be at least partly controlled on the basis of measurements performed by the pressure sensors. According to this embodiment, the measurements performed by the pressure sensors are also made available to the pitch controller, and are thereby taken into account during control of the pitch angles of the wind turbine blades. The pressure conditions along the wind turbine blades will, in some situations, change faster than other suitable control parameters for controlling the pitch angles of the wind turbine blades. Therefore the pressure measurements may provide an early indication that operational conditions are changing. This allows the pitch controller to react faster to such changes. For instance, the pressure measurement could be used for estimating various wind conditions which play an important role in the assessment of various loads and/or for assessing the need for pitch actuation in combination with activation of the air deflectors.

The invention further relates to a control system for controlling a wind turbine, the control system being adapted to perform the method described above, and to a wind turbine comprising a set of wind turbine blades, each wind turbine blade being provided with at least one air deflector being movable between an activated position in which it protrudes from a surface of the wind turbine blade and a de-activated position, the wind turbine further comprising such a control system.

Furthermore, the invention relates to a computer program product comprising program code which, when executed is adapted to perform the method described above.

BRIEF DESCRIPTION OF THE DRAWINGS

The invention will now be described in further detail with reference to the accompanying drawings in which.

DETAILED DESCRIPTION OF THE DRAWINGS

Figure 1:
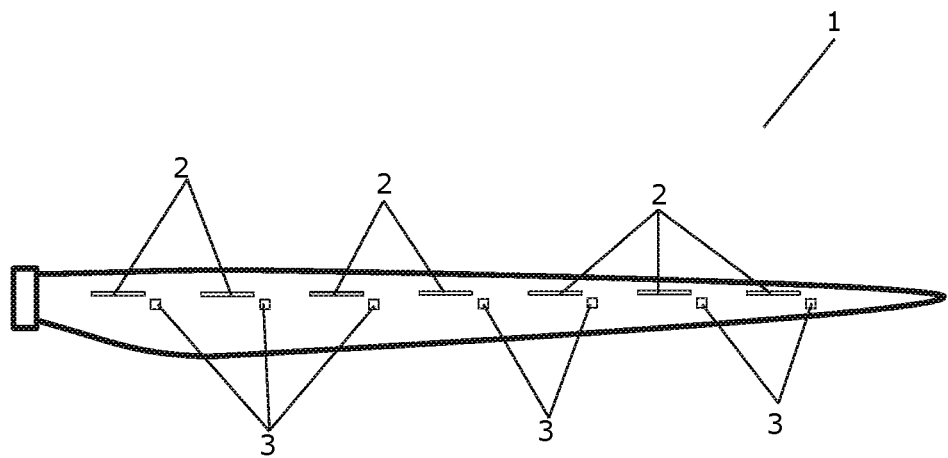
FIG. 1 is a side view of a wind turbine blade being provided with a number of air deflectors and pressure sensors.

FIG. 1 is a side view of a wind turbine blade 1 being provided with seven air deflectors 2 arranged on the suction side of the wind turbine blade 1. The air deflectors 2 are distributed along the length of the wind turbine blade 1. Each air deflector 2 is in the form of a plate which can be moved between an activated position and a de-activated position. In the activated position the air deflector 2 protrudes from the surface of the wind turbine blade 1.

In the de-activated position the air deflector 2 is retracted to a position within the wind turbine blade 1.

Thus, when the air deflectors 2 are in the activated position, they disturb the air flow along the surface of the suction side of the wind turbine blade 1, thereby reducing the lift of the wind turbine blade 1.

The wind turbine blade 1 is further provided with seven pressure sensors 3 arranged on the suction side of the wind turbine blade 1, in such a manner that a pressure sensor 3 is arranged in the vicinity of each air deflector 2. Thereby local pressure measurements can be obtained at the positions of the each of the air deflectors 2. This allows the air deflectors 2 to be controlled on the basis of local pressure conditions.

Figure 2:
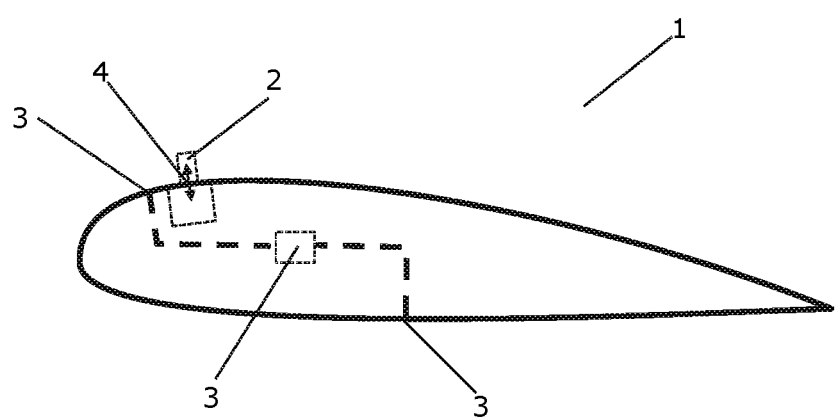
FIG. 2 is a cross sectional view of the wind turbine blade of FIG. 1.

FIG. 2 is a cross sectional view of the wind turbine blade 1 of FIG. 1. In FIG. 2 it can be seen that the wind turbine blade 1 is further provided with pressure sensors 3 arranged on the pressure side of the wind turbine blade 1, thereby allowing the air deflectors 2 to be controlled based on the local pressure conditions on the suction side, as well as on the pressure side, of the wind turbine blade 1. In the illustrated embodiment, the pressure sensor is shown to comprise two orifices at the blades surfaces and a central transducer. Arrow 4 indicates that the air deflector 2 can be moved between the activated position and the de-activated position.

Figure 3:
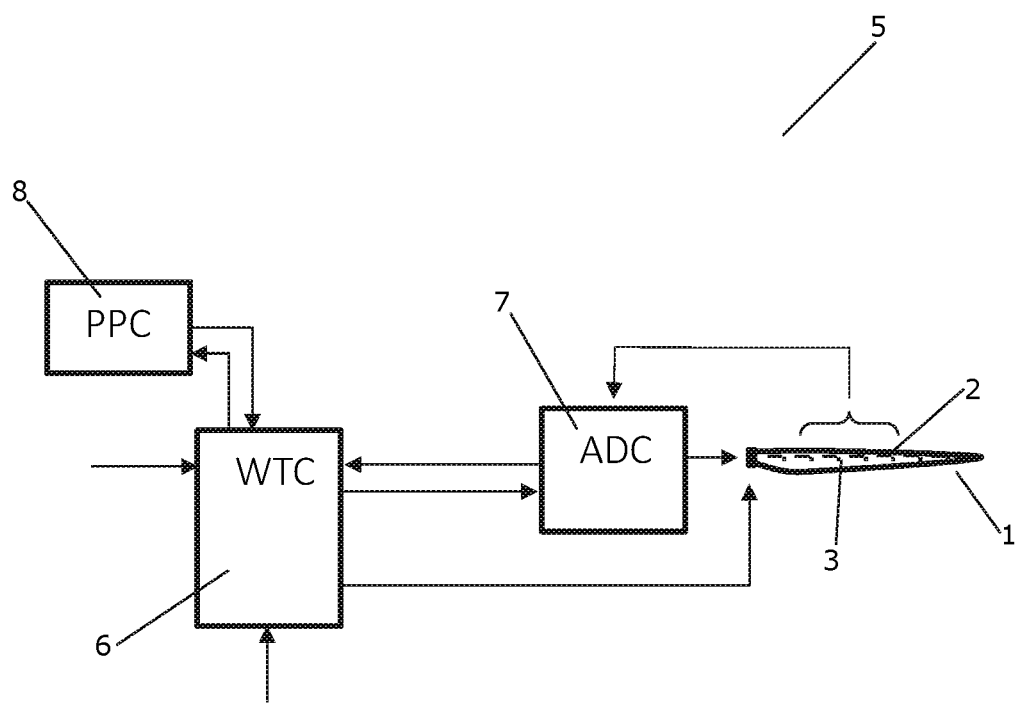
FIG. 3 is a diagrammatic view of a control system for a wind turbine for performing a method according to an embodiment of the invention.

FIG. 3 is a diagrammatic view of a control system 5 for a wind turbine for performing a method according to an embodiment of the invention. The control system 5 comprises a wind turbine controller WTC, 6, an air deflector controller ADC, 7 and a power plant controller PPC, 8. The wind turbine controller 6 controls the wind turbine as such, including controlling the pitch angles of the wind turbine blades 1. The air deflector controller 7 controls air deflectors mounted on the wind turbine blades 1. The power plant controller 8 controls a wind power plant or wind farm where the wind turbine is arranged. For instance, the power plant controller 8 may control the wind power plant or wind farm in order to ensure that the wind power plant or wind farm provides a required power output to a power grid. In an embodiment, the WTC 6 and the ADC 7 are implemented as functional units in a common control system.

In an embodiment, the air deflector controller 7 receives sensor input from the pressure sensors 3 arranged on the wind turbine blades 1. Based on these sensor input, the air deflector controller 7 controls the air deflectors 2, i.e. the air deflector controller 7 determines which of the air deflectors 2 should be in the activated state, and which should be in the de-activated state, when and for how long. Furthermore, the air deflector controller 7 activates the air deflectors 2 which need to be moved from the de-activated state to the activated state, and de-activates the air deflectors 2 which need to be moved from the activated state to the de-activated state. Finally, the air deflector controller 7 supplies information regarding the control of the air deflectors 2 to the wind turbine controller 6. The air deflector controller 7 may further provide the sensor measurements of the pressure sensors 3 directly to the wind turbine controller 6.

Accordingly, the wind turbine controller 6 receives information regarding the control of the air deflectors 2 from the air deflector controller 7. Furthermore, the wind turbine controller 6 receives various sensor input and parameter input required in order to control the wind turbine appropriately. The wind turbine controller 6 also receives input from the power plant controller 8. This input could, e.g., include a power reference, grid information, etc. Based on the various input, the wind turbine controller 6 controls the wind turbine, including controlling the pitch angles of the wind turbine blades 1. Since the wind turbine controller 6 receives information regarding the control of the air deflectors 2, it controls the pitch angles of the wind turbine blades 1 while taking this information into account.

Based on the various input described above, the wind turbine controller 6 is capable of determining that a given event has taken place. The event could, e.g., be a change in wind direction, a gust, a change in wind shear, an extreme coherent gust with direction change (ECD), a change in power reference, a shut down command, a grid loss, or any other suitable kind of event which causes a change in operational conditions, requiring that the wind turbine is controlled at a new operating state. Following the registration of such an event, the wind turbine controller 6 controls at least the pitch angles of the wind turbine blades 1 in order to reach the new operating state, and while taking the information regarding the control of the air deflectors 2 into account. Simultaneously, the air deflector controller 7 controls the air deflectors 2 in order to reach the new operating state. In an embodiment, also the wind turbine controller 6 may determine an air deflector setting, based on the registered event or based on sensor input, and supply this air deflector setting to the air deflector controller 7, in order to allow the air deflector controller 7 to control the air deflectors 2 in accordance with the determined air deflector setting.

Thus, the air deflectors 2 as well as the pitch angles of the wind turbine blades 1 are controlled in order to reach the new operating state, and in such a manner that information regarding control of the air deflectors 2 is taken into account when controlling the pitch angles of the wind turbine blades 1.

Figure 4:
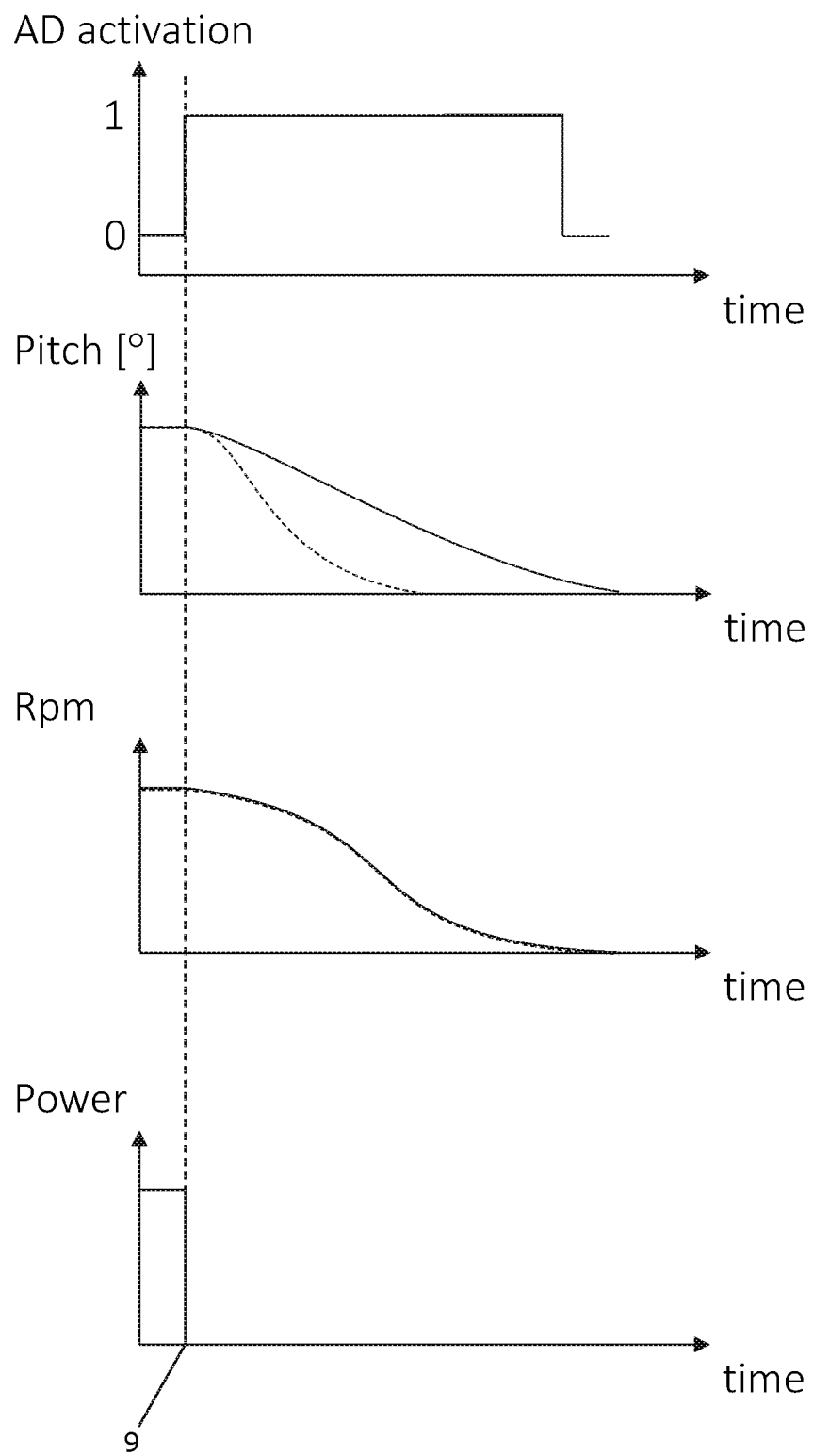
FIG. 4 illustrates a method according to an embodiment of the invention following a shut down command.

FIG. 4 is a set of graphs illustrating a method according to an embodiment of the invention, following a shut down event. From the top downwards the graphs illustrate activation of air deflectors, pitch angle, rotor speed and power reference as a function of time.

At time 9 a shut down command is received, moving the power reference to zero. In the response thereto, the air deflectors are immediately activated, i.e. the air deflector activation is moved from 0 to 1. This reduces the lift of the wind turbine blades. It can be seen that the reaction time of the air deflectors is very fast.

Simultaneously, the pitch angles of the wind turbine blades are controlled in order to shut down the wind turbine. In the graph, the solid line represents the pitch angles in the case where the air deflectors are activated, and the dashed line represents the pitch angles in the case where no air deflectors are activated. It can be seen that, in the case that no air deflectors are activated, a much more aggressive pitch strategy is required in order to shut down the wind turbine within a required transition time, than is the case when the air deflectors are activated. The more aggressive pitch strategy has a higher load impact on at least the wind turbine blades, the blade pitch bearings, and the wind turbine tower. Accordingly, activating the air deflectors allows the load impact on the wind turbine to be reduced, without compromising the transition time from the initial operating state to the operating state where the wind turbine has been shut down.

The pitch controller receives information regarding the control of the air deflectors, and it is therefore capable of taking this into account when controlling the pitch angles of the wind turbine blades. Thus, since the pitch controller knows that the air deflectors have been activated, it can safely select the less aggressive pitch strategy, thereby ensuring that the load impact on the wind turbine is reduced.

When the shut down of the wind turbine has been completed, the air deflectors are de-activated.

Figure 5:
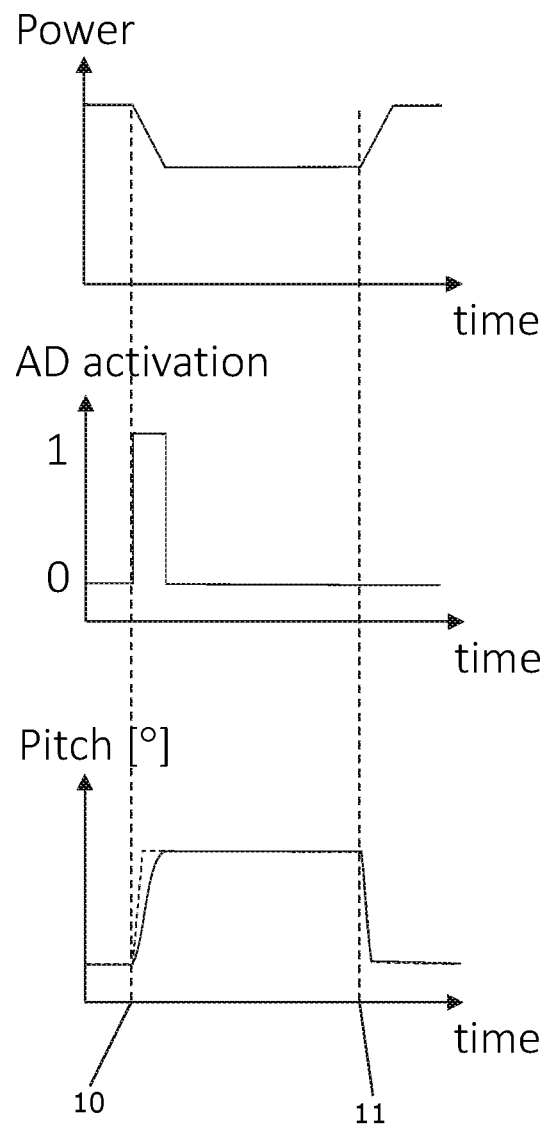
FIGS. 5 and 6 illustrate a method according to embodiments of the invention following a change in power reference.
Figure 6:
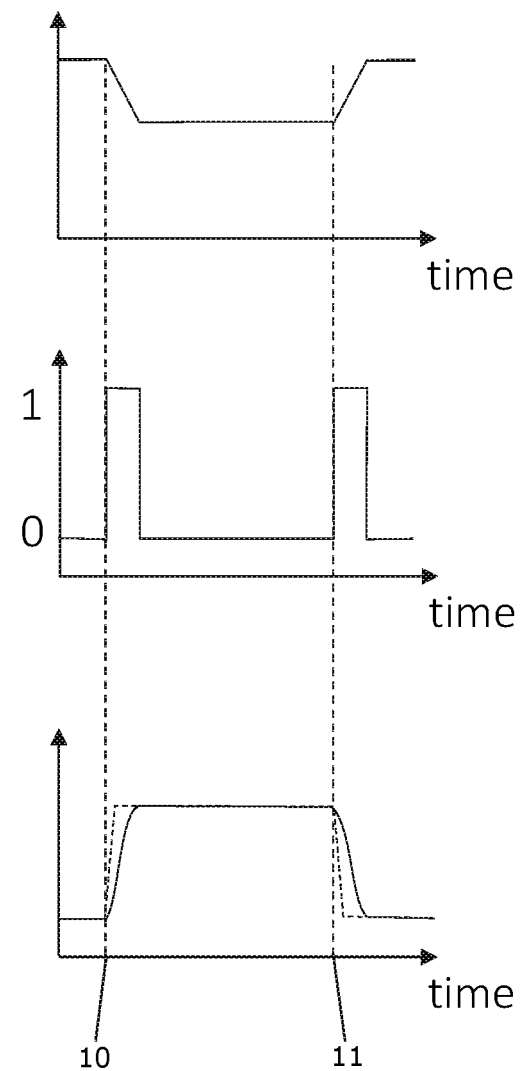

FIGS. 5 and 6 each shows a set of graphs illustrating a method according to an embodiment of the invention, following a change in power reference. FIG. 5 illustrates a situation in which the wind turbine blades are only provided with air deflectors on the suction side of the wind turbine blades, while FIG. 6 illustrates a situation in which the wind turbine blades are provided with air deflectors on the suction side of the wind turbine blades, as well as on the pressure side of the wind turbine blades. From the top downwards the graphs illustrate power reference, activation of air deflectors and pitch angle as a function of time.

At time 10 a derate command is received, i.e. a command requesting a gradual decrease of the power reference to a new, lower level. In response thereto, the air deflectors arranged on the suction side of the wind turbine blades are immediately activated, and they are de-activated when the power reference has reached the new, lower level. As described above, the activation of the air deflectors arranged on the suction side of the wind turbine blades reduces the lift of the wind turbine blades.

Simultaneously, the pitch angles of the wind turbine blades are controlled in order to reach a new operating state allowing the new, lower power reference level to be reached. The solid line represents the situation in which the air deflectors are activated, and the dashed line represents the situation where no air deflectors are activated. Similarly to the situation described above with reference to FIG. 4, a more aggressive pitch strategy must be applied in order to reach the new operating state, when the air deflectors are not activated than is the case when the air deflectors are activated. As described above, providing information to the pitch controller regarding the control of the air deflectors allows the pitch controller to select the less aggressive control strategy, thereby ensuring that the load impact on the wind turbine is reduced.

At time 11 another power reference signal is received, requesting that the power reference is gradually increased to the original power reference level. Activating the air deflectors arranged on the suction side of the wind turbine blades would decrease the lift of the wind turbine blades, and would therefore result in a decrease in the produced power.

Accordingly, in the situation illustrated in FIG. 5, where air deflectors are only arranged on the suction side of the wind turbine blades, it will not contribute to reaching the new operating state to activate the air deflectors. Therefore, the air deflectors remain de-activated, and the new operating state must be reached solely by controlling the pitch angles of the wind turbine blades.

However, in the situation illustrated in FIG. 6, the wind turbine blades are also provided with air deflectors arranged on the pressure side of the wind turbine blades. Activating these air deflectors will cause an increase in the lift, thereby resulting in an increase in the power production. Therefore, in this case, the air deflectors arranged on the pressure side of the wind turbine blades are activated at time 11. Similarly to the situation described above, it can be seen that a less aggressive pitch strategy can thereby be selected, and the load impact on the wind turbine can be reduced.

Figures 7, 8:
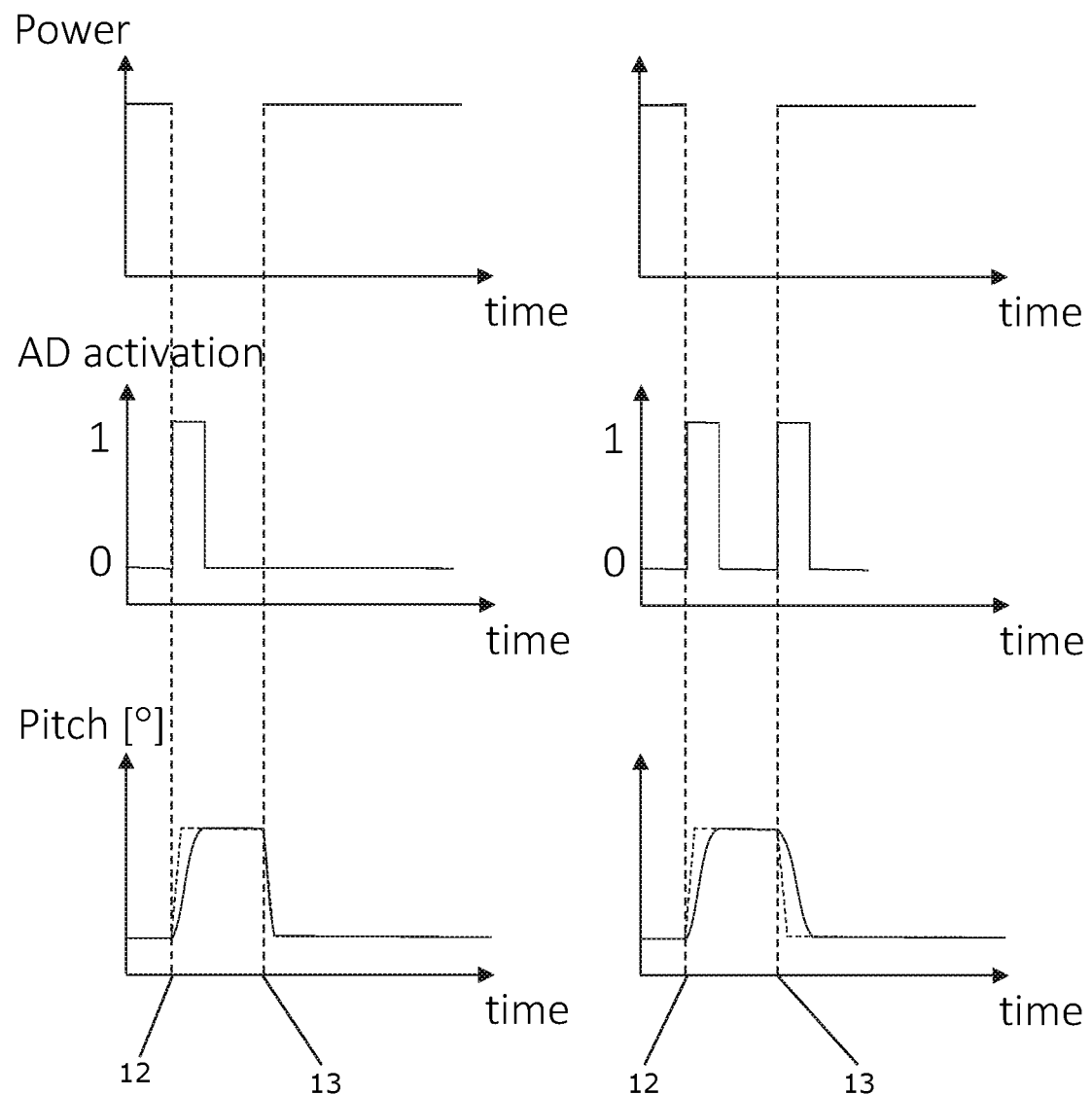
FIGS. 7 and 8 illustrate a method according to embodiments of the invention following a grid loss.

FIGS. 7 and 8 each shows a set of graphs illustrating a method according to an embodiment of the invention, following a temporary grid loss or voltage drop, e.g. low voltage event or a zero voltage event. FIG. 7 illustrates a situation in which the wind turbine blades are only provided with air deflectors on the suction side of the wind turbine blades, while FIG. 8 illustrates a situation in which the wind turbine blades are provided with air deflectors on the suction side of the wind turbine blades, as well as on the pressure side of the wind turbine blades. From the top downwards the graphs illustrate power reference, activation of air deflectors and pitch angle as a function of time.

At time 12 a grid loss or a voltage drop is registered. During the grid loss or voltage drop event no valid power reference is available and the counter-torque from the grid is lost or reduced. In order to keep the rotor speed under control, the air deflectors arranged on the suction side of the wind turbine blades are activated, and the pitch angles of the wind turbine blades are adjusted, in response to this. Also in this situation, a less aggressive pitch strategy can be selected when the air deflectors are activated than when no air deflectors are activated.

At time 13 the grid is once again restored, and the power reference is increased to the original level. As described above with reference to FIGS. 5 and 6, activation of the air deflectors arranged on the suction side of the wind turbine blade will not contribute to increasing the power output, and therefore no air deflectors are activated in the situation illustrated in FIG. 7. However, in the situation illustrated in FIG. 8, the air deflectors arranged on the pressure side of the wind turbine blades are activated, thereby allowing a less aggressive pitch strategy to be selected.

Figure 9:
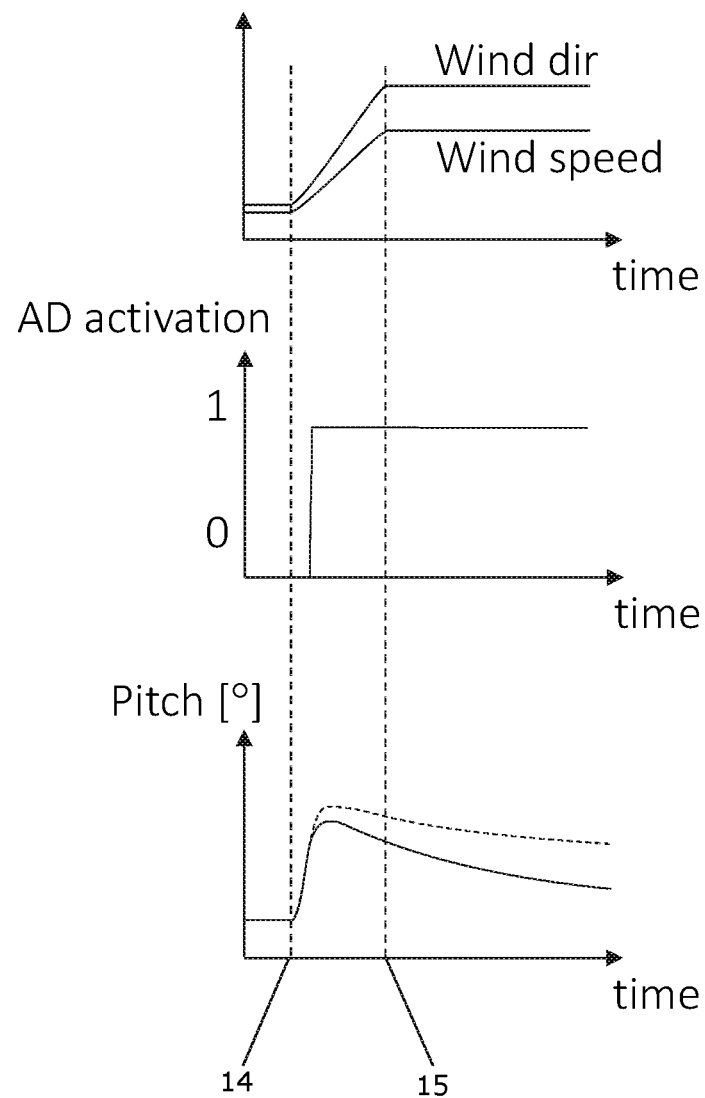
FIG. 9 illustrates a method according to an embodiment of the invention following an extreme coherent gust with direction change (ECD) event.

FIG. 9 is a set of graphs illustrating a method according to an embodiment of the invention, following an extreme coherent gust with direction change (ECD) event. From the top downwards the graphs illustrate wind direction and wind speed, activation of air deflectors and pitch angle as a function of time.

From time 14 to time 15 a simultaneous or almost simultaneous change in wind speed and wind direction takes place. In order to better illustrate the deployment of the air deflectors during an ECD event, the wind speed and wind direction change are illustrated in an idealized situation where the wind speed and wind direction change from a first stable situation to a second stable situation.

Using air pressure sensors arranged on the wind turbine blades at positions at or near the positions of the air deflectors, the initiation of the changes in wind speed and wind direction are quickly registered at time 14. In response thereto, the air deflectors are activated once it is clear that the changes in wind speed and wind direction relate to an ECD event.

In the case that no air deflectors are activated, illustrated by the dashed line, the gust will result in a rotor speed increase, and in response thereto the pitch controller will adjust the pitch angles of the wind turbine blades, pitching out of the wind, in order to keep the rotor speed down. When the yaw error reaches a certain level, the rotor speed decreases, and in response thereto the pitch controller adjusts the pitch angles of the wind turbine blades, pitching into the wind, in order to keep the rotor speed up, but in such a manner that stalling is avoided.

In the case that air deflectors are activated, illustrated by the solid line, the ECD is detected earlier, using the pressure sensors arranged near each of the air deflectors. The activation of the air deflectors has the consequence that the increase in rotor speed caused by the gust is smaller, and therefore a smaller adjustment of the pitch angles of the wind turbine blades is required. This reduces the load impact on the wind turbine. Furthermore, the pressure sensor signals also results in a more accurate adjustment of the collective pitch angles, thereby keeping the wind turbine out of stall.

Figure 10:
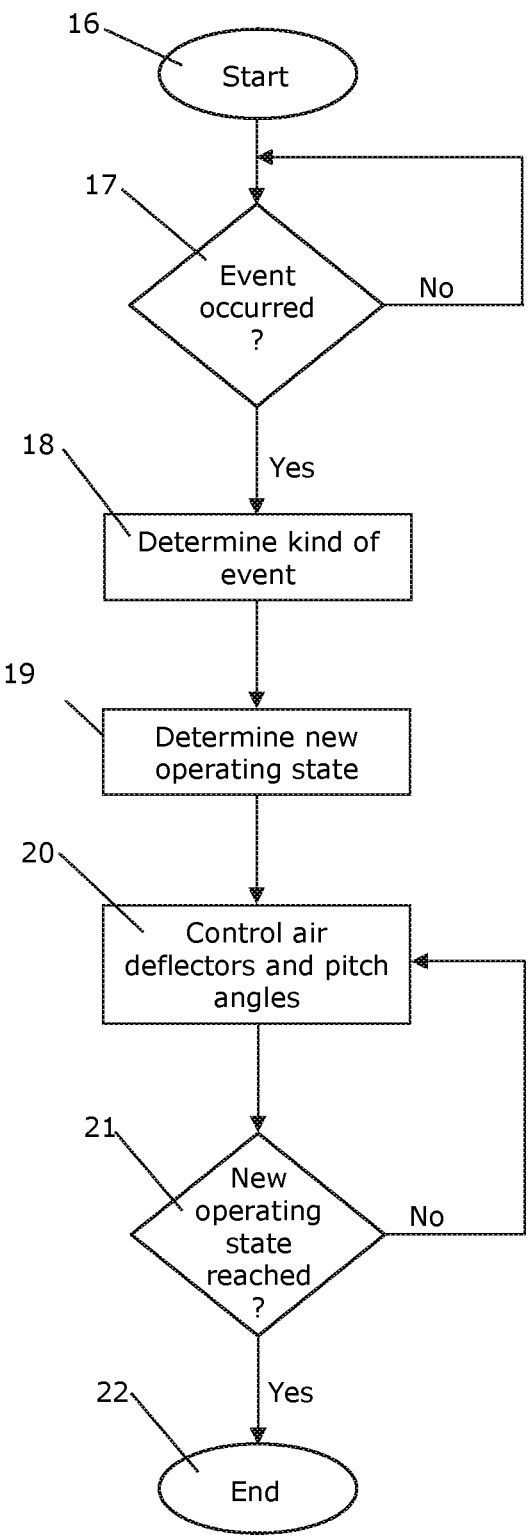
FIG. 10 is a flow chart illustrating a method according to an embodiment of the invention.

FIG. 10 is a flow chart illustrating a method according to an embodiment of the invention. The process is started at step 16. At step 17 it is investigated whether or not an event has occurred, which changes the operational conditions in such a manner that a change in operating state is required. If this is not the case, the process is returned to step 17 for continued monitoring for relevant events.

In the case that step 17 reveals that a relevant event has occurred, the process is forwarded to step 18, where the kind of event is determined.

Next, at step 19, a new operating state is determined, based on the registered event. The new operating state meets the requirements of the changed operational conditions which were caused by the registered event.

At step 20 the air deflectors and the pitch angles of the wind turbine blades are controlled in order to reach the new operating state. This is performed in such a manner that the control of the pitch angles is performed while taking information regarding the control of the air deflectors into account. Coordinating the control of the air deflectors and the control of the pitch angles of the wind turbine blades in this manner allows the new operating state to be reached while meeting certain requirements, e.g. in terms of load impact, reaction time, transition time, etc.

At step 21 it is investigated whether or not the new operating state has been reached. If this is not the case, the process is returned to step 20 for continued control of the air deflectors and the pitch angles of the wind turbine blades. In the case that step 21 reveals that the new operating state has been reached, the process is ended at step 22.

The invention claimed is:

1. A method for controlling a wind turbine, the wind turbine comprising a set of wind turbine blades, each wind turbine blade being provided with at least one air deflector being movable between an activated position in which it protrudes from a surface of the wind turbine blade and a de-activated position, the wind turbine being operated in a first operating state, the method comprising:
   registering the occurrence of an event causing a change in operational conditions;
   determining a new operating state for the wind turbine, the new operating state meeting requirements of the changed operational conditions; and
   controlling the air deflectors of the wind turbine blades and pitch angles of the wind turbines blades in order to reach the new operating state for the wind turbine, wherein the control of the pitch angles of the wind turbine blades is performed while taking information regarding the control of the air deflectors into account, and wherein controlling the air deflectors and the pitch angles of the wind turbine blades comprises:
      determining a load impact on the wind turbine and a transition time of reaching the new operating state in a situation where only air deflectors are deployed;
      determining that the load impact is larger than a target load impact or that the transition time is larger than a target transition time;
      determining a pitch response required to reach the target load impact or the target transition time; and
      controlling the pitch angles of the wind turbine blades according to the determined pitch response.

2. The method according to claim 1, wherein controlling the air deflectors and the pitch angles of the wind turbine blades further comprises:
   controlling the air deflectors based on one or more sensor input, using an air deflector controller;
   the air deflector controller providing information regarding the control of the air deflectors to a pitch controller; and
   controlling the pitch angles of the wind turbine blades, using the pitch controller, and taking the information regarding the control of the air deflectors into account.

3. The method according to claim 1, wherein controlling the air deflectors and the pitch angles of the wind turbine blades comprises:
   determining an air deflector setting, based on the registered event;
   controlling the air deflectors in accordance with the determined air deflector setting; and
   controlling the pitch angles of the wind turbine blades, while taking the determined air deflector setting into account.

4. The method according to claim 1, wherein determining an air deflector setting is further based on the first operating state or on the new operating state.

5. The method according to claim 1, wherein the air deflectors are controlled to be fully activated during the transition from the first operating state to the new operating state, and wherein the pitch angles of the wind turbine blades are controlled to ensure that the target load impact or the target transition time is reached.

6. The method according to claim 1, wherein the air deflectors and the pitch angles of the wind turbine blades are controlled by means of a central controller.

7. The method according to claim 1, wherein the air deflectors are controlled by means of an air deflector controller and the pitch angles are controlled by means of a pitch controller, and wherein the air deflector controller and the pitch controller are arranged for communicating with each other.

8. The method according to claim 1, wherein the registered event is a change in wind direction, a gust, a change in wind shear, a change in power reference, a shut down command, or a grid loss.

9. The method according to claim 1, wherein each air deflector has at least one pressure sensor associated therewith, each pressure sensor being arranged to measure a pressure prevailing in the vicinity of the associated air deflector, and wherein the air deflectors are at least partly controlled on the basis of measurements performed by the pressure sensors.

10. The method according to claim 9, wherein the pitch angles of the wind turbine blades are at least partly controlled on the basis of measurements performed by the pressure sensors.

11. A control system for controlling a wind turbine, the wind turbine comprising a set of wind turbine blades, each wind turbine blade being provided with at least one air deflector being movable between an activated position in which it protrudes from a surface of the wind turbine blade and a de-activated position, the wind turbine being operated in a first operating state, the control system, comprising:
   a memory containing code; and
   a processor which, when executing the code, performs an operation comprising:
      registering the occurrence of an event causing a change in operational conditions,
      determining a new operating state for the wind turbine, the new operating state meeting requirements of the changed operational conditions, and
      controlling the air deflectors of the wind turbine blades and pitch angles of the wind turbines blades in order to reach the new operating state for the wind turbine, wherein the control of the pitch angles of the wind turbine blades is performed while taking information regarding the control of the air deflectors into account, and wherein controlling the air deflectors and the pitch angles of the wind turbine blades comprises:
         determining a load impact on the wind turbine and a transition time of reaching the new operating state in a situation where only air deflectors are deployed,
         determining that the load impact is larger than a target load impact or that the transition time is larger than a target transition time,
         determining a pitch response required in order to reach the target load impact or the target transition time, and
         controlling the pitch angles of the wind turbine blades in accordance with the determined pitch response.

12. The control system according to claim 11, wherein controlling the air deflectors and the pitch angles of the wind turbine blades comprises:

controlling the air deflectors based on one or more sensor input, using an air deflector controller, the air deflector controller providing information regarding the control of the air deflectors to a pitch controller, and controlling the pitch angles of the wind turbine blades, using the pitch controller, and taking the information regarding the control of the air deflectors into account.

13. The control system according to claim 11, wherein controlling the air deflectors and the pitch angles of the wind turbine blades comprises:

determining an air deflector setting, based on the registered event, controlling the air deflectors in accordance with the determined air deflector setting, and controlling the pitch angles of the wind turbine blades while taking the determined air deflector setting into account.

14. The control system according to claim 13, wherein determining an air deflector setting is further based on the first operating state or on the new operating state.

15. A wind turbine, comprising:

a tower;

a nacelle disposed on the tower;

a rotor extending from the nacelle;

a set of wind turbine blades disposed on one end of the rotor, each wind turbine blade being provided with at least one air deflector being movable between an activated position in which it protrudes from a surface of the wind turbine blade and a de-activated position, the wind turbine being operated in a first operating state; and a control system operable to perform an operation, comprising:

registering the occurrence of an event causing a change in operational conditions, determining a new operating state for the wind turbine, the new operating state meeting requirements of the changed operational conditions, and controlling the air deflectors of the wind turbine blades and pitch angles of the wind turbines blades in order to reach the new operating state for the wind turbine, wherein the control of the pitch angles of the wind turbine blades is performed while taking information regarding the control of the air deflectors into account, and wherein controlling the air deflectors and the pitch angles of the wind turbine blades comprises:

determining a load impact on the wind turbine and a transition time of reaching the new operating state in a situation where only air deflectors are deployed, determining that the load impact is larger than a target load impact or that the transition time is larger than a target transition time, determining a pitch response required in order to reach the target load impact or the target transition time, and controlling the pitch angles of the wind turbine blades in accordance with the determined pitch response.

* * * * *